US 6,606,387 B1

(12) United States Patent
Abraham

(10) Patent No.: US 6,606,387 B1
(45) Date of Patent: Aug. 12, 2003

(54) SECURE ESTABLISHMENT OF CRYPTOGRAPHIC KEYS

(75) Inventor: Dennis G. Abraham, Concord, NC (US)

(73) Assignee: Trusted Security Solutions, Inc., Matthews, NC (US)

( * ) Notice: Subject to any disclaimer, the term of this patent is extended or adjusted under 35 U.S.C. 154(b) by 0 days.

(21) Appl. No.: 09/273,416

(22) Filed: Mar. 19, 1999

Related U.S. Application Data

(60) Provisional application No. 60/078,667, filed on Mar. 20, 1998.

(51) Int. Cl.[7] .................................................. H04L 9/14
(52) U.S. Cl. ......................... 380/277; 380/278; 380/44; 380/47
(58) Field of Search ................................ 380/277–279, 380/44, 47, 243; 713/171

(56) References Cited

U.S. PATENT DOCUMENTS

| | | | |
|---|---|---|---|
| 4,819,267 A | | 4/1989 | Cargile et al. |
| 5,003,593 A | * | 3/1991 | Mihm, Jr. ............... 379/202.01 |
| 5,060,263 A | | 10/1991 | Bosen et al. |
| 5,173,938 A | * | 12/1992 | Steinbrenner et al. ...... 380/273 |
| 5,442,703 A | * | 8/1995 | Kim et al. ...................... 380/2 |
| 5,917,911 A | * | 6/1999 | Dabbish et al. ............. 380/277 |

FOREIGN PATENT DOCUMENTS

| | | |
|---|---|---|
| EP | 0 254 812 | 2/1988 |
| GB | 2 274 229 | 7/1994 |

* cited by examiner

Primary Examiner—Gilberto Barron
Assistant Examiner—G. Gurshman
(74) Attorney, Agent, or Firm—Marcia L. Doubet; Christopher C. Dremann

(57) ABSTRACT

A system and method are disclosed for securely establishing a cryptographic key between a first cryptographic device, for example a host cryptographic security module, and a second cryptographic device, for example a bank Automated Teller Machine (ATM). A plurality of key components is generated from a pool of random numbers and a unique reference number indexes each of the key components. The key components are encrypted, stored and indexed in the host security module by the corresponding reference numbers. The key components are arbitrarily distributed to field personnel in tamper evident envelopes to be entered into the ATM. Each of the tamper evident envelopes is marked with the reference number corresponding to the key component contained in the envelope. At least two field personnel each enter a different key component into the ATM to form the cryptographic key. Each then communicates the reference number corresponding to the key component and the identification number of the ATM to the host security module. The host security module retrieves the encrypted key components corresponding to the reference numbers provided by the field personnel, decrypts them, and combines the two decrypted key components to recreate the cryptographic key created in the ATM. The encrypted cryptographic key may be transmitted to a third cryptographic device by means of a previously established cryptographic key.

13 Claims, 3 Drawing Sheets

SECURE ESTABLISHMENT OF CRYPTOGRAPHIC KEYS

CROSS REFERENCE TO RELATED APPLICATION

This application claims the benefit of Provisional Application Serial No. 60/078,667, filed Mar. 20, 1998, the entire disclosure of which is herein incorporated by reference.

BACKGROUND OF THE INVENTION

1. Field of the Invention

The invention relates to a system and method for securely establishing a cryptographic key between a first cryptographic device and a second cryptographic device. More particularly, the invention relates to a system and method for establishing initial cryptographic keys for a plurality of cryptographic devices that are geographically widely scattered, such as bank Automated Teller Machines (ATMs).

2. Description of Related Art

A bank or other financial institution may provide Automated Teller Machines (ATMs), or equivalent field devices, for the convenience of its customers. The ATMs usually communicate electronically with a central computer physically located at a branch office of the bank so that the customer can manipulate his bank account at any time regardless of the operating hours of the branch without interacting with a human representative. Such bank transactions may include the transfer of money between accounts, the deposit and withdrawal of funds and the like. Network operating rules and voluntary ANSI Standards require the use of cryptography to protect sensitive information such as the Personal Identification Number (PIN) usually associated with such bank transactions from potential compromise by an opponent intent on committing fraud against the network and the cardholder.

As should be expected, it is necessary for the bank to verify that a field device, for example an ATM, is authorized to communicate with the central computer at the branch office. Such measures endeavor to prevent an unauthorized device from imitating the ATM and accessing a customer's account without proper authorization. There are a number of ways in which to establish secure electronic communications between a network of ATMs and the central computer. One way is via a dedicated arrangement of data transmission lines. The transmission lines connect the ATMs directly to the central computer. Accordingly, only authorized ATMs can communicate with the central computer over the dedicated transmission lines. However, the cost of installing dedicated transmission lines and the associated communications hardware is generally prohibitive, especially in light of the need to secure rights of way to carry the transmission lines between each of the ATMs and the central computer. Furthermore, even dedicated transmission lines may still be vulnerable to access by individuals possessing the ability to physically tap into the transmission lines.

A more economical approach to establish secure electronic communications between a network of field devices and a host device is by means of cryptography. Good cryptographic practice requires that each pair of communicating devices on the network share a unique cryptographic key. The use of a unique cryptographic key for each pair of communicating devices limits the degree to which an unauthorized user can compromise the network to that one pair of devices. Where a plurality of devices are provided with a common cryptographic key, often referred to as a Global key, an unauthorized user can compromise any of the devices by compromising any one of the devices sharing the Global key. For example, an unauthorized user could gain access to a large number of ATMs with the knowledge of only a single cryptographic key. The banking industry actually facilitates this high degree of risk since the present practice is to load many field devices in a network with a Global key for operational convenience.

Two general types of cryptography are presently in use. One type is public key or asymmetric cryptography, for example RSA. The other type is symmetric cryptography, for example the Data Encryption Algorithm (DEA). The DEA is currently the most widely used algorithm in ATM banking devices. Symmetric cryptography requires the same cryptographic key to be established at both cryptographic devices, namely the field device and the host device. In addition, symmetric cryptography requires the cryptographic key to be managed under the principles of split knowledge and dual control usually implemented by utilizing two different individuals, referred to as key custodians, to establish the key. Each key custodian is entrusted with a portion, referred to as a component, of the cryptographic key that they must physically enter into the field device, for example an ATM. Thus, the key custodians must personally visit each ATM in the network in turn to establish the appropriate key in the ATM. The same, or other key custodians, must then personally visit the host device to establish the same cryptographic key in the host device. Since the ATMs and the host devices are oftentimes geographically widely scattered, it is frequently impractical for the key custodians to accomplish the necessary visits within an acceptable timeframe. As a result of this key management logistics problem, many banks use the same cryptographic key for a large number of ATMs on a single ATM network.

With the above concerns in mind, it is an objective of the present invention to provide a system and method for securely establishing a unique cryptographic key between a first cryptographic device and a second cryptographic device.

It is a further, and more particular, objective of the present invention to provide a system and method for securely establishing a cryptographic key between a first cryptographic device and a second cryptographic device without the need for the extensive protective measures typically required to manage the components of the cryptographic key.

It is still a further objective of the present invention to provide a system and method for securely establishing a cryptographic key between a first cryptographic device and a second cryptographic device that are geographically widely scattered.

It is still a further objective of the present invention to provide a system and method for securely establishing a cryptographic key between a first cryptographic device and a second cryptographic device without the custodial overhead normally associated with the distribution and secure management of the components of the key.

It is still a further objective of the present invention to provide a system and method for securely establishing a cryptographic key between a first cryptographic device and a second cryptographic device wherein a plurality of unrelated random numbers are distributed to serve as key components.

It is still a further objective of the present invention to provide a system and method for ensuring a high probability that a cryptographic key established between a first cryptographic device and a second cryptographic device is unique.

It is still a further objective of the present invention to provide a system and method for securely establishing a cryptographic key between a first cryptographic device and a second cryptographic device including a database of information relating to the establishment of the cryptographic key that permits the devices, the key custodians and the key components utilized to establish the cryptographic key to be traced and routinely audited.

These and other objectives and advantages will become more readily apparent to those of skill in the art with reference to the following detailed description and the accompanying drawing figures.

SUMMARY OF THE INVENTION

The aforementioned objectives and advantages are realized by a system and method for establishing secure cryptographic keys between cryptographic devices according to the present invention. The system includes a plurality of key components, each having a first unique identifier. Preferably, each of the key components is a random number generated by a strong random number generator and is indexed to a predetermined reference number.

The system further includes a first cryptographic device. The first cryptographic device includes an electronic database wherein each of the key components is encrypted and indexed by its corresponding first unique identifier. Preferably, the first cryptographic device further includes a Tamper Resistant Security Module (TRSM). The system further includes a second cryptographic device for entering at least two of the key components therein to establish the cryptographic key within the second cryptographic device. The second cryptographic device is assigned a second unique identifier for a purpose to be described hereinafter. Preferably, the second cryptographic device is a bank ATM and the at least two key components are entered into the ATM. Most preferably, the two key components entered into the ATM are different and are entered by different key custodians, for example an installation and service representative and a bank representative.

The system further includes means for communicating the first unique identifier of the key components entered into the second cryptographic device and the second unique identifier assigned to the second cryptographic device to the first cryptographic device. Preferably, the means for communicating is an interactive voice response unit in conjunction with an input device, such as a DTMF or "touch-tone" telephone. The first cryptographic device further includes means for retrieving and combining the encrypted key components indexed by the first unique identifiers corresponding to the key components entered into the second cryptographic device from the electronic database to recreate the cryptographic key established in the second cryptographic device.

Preferably, the system further comprises a plurality of tamper evident envelopes. Each of the tamper evident envelopes is utilized to retain and transport one of the key components corresponding to the first unique identifier marked on the inside or the outside of the envelope. If the seal on the tamper evident envelope is broken, the key custodian merely discards the first and selects a second envelope containing another random number to be entered into the second cryptographic device. Accordingly, it is not necessary to obtain a new key component that is related to another key component in a predetermined manner.

The method of the invention includes the first step of providing a plurality of key components wherein each of the plurality of key components has a first unique identifier. Preferably, the step of providing a plurality of key components includes the further step of generating a plurality of random numbers using a strong random number generator with each of the random numbers corresponding to a predetermined reference number. The step of providing a plurality of key components may also include the further steps of sealing each of the key components in a tamper evident envelope and marking the envelope with the reference number corresponding to the random number inside the tamper evident envelope.

The method includes the second step of providing a first cryptographic device comprising an electronic database. Preferably, the step of providing a first cryptographic device includes the further step of providing a Tamper Resistant Security Module (TRSM). The method includes the third step of programming the electronic database of the first cryptographic device such that each of the plurality of key components is encrypted and indexed by its corresponding first unique identifier.

The method includes the fourth step of providing a second cryptographic device for entering at least two of the plurality of key components therein to establish a cryptographic key, the second cryptographic device being assigned a second unique identifier for a purpose to be described hereinafter. Preferably, the step of providing a second cryptographic device includes the further step of providing a bank Automated Teller Machine (ATM).

The method includes the fifth step of communicating the first unique identifier of the key components entered into the second cryptographic device and the second unique identifier assigned to the second cryptographic device to the first cryptographic device. Preferably, the step of communicating includes the further step of electronically communicating the first unique identifiers and the second unique identifier to the first cryptographic device via an interactive voice response unit.

The method includes the sixth step of retrieving the encrypted key components indexed by the first unique identifiers communicated to the first cryptographic device. Finally, the method includes the seventh step of combining the encrypted key components to recreate the cryptographic key established in the second cryptographic device. For a purpose to be described hereinafter, the method of the invention may also include the eighth step of transmitting the cryptographic key recreated in the first cryptographic device to a third cryptographic device. Preferably the cryptographic key is transmitted to the third cryptographic device by means of a Key Encryption Key previously established in a known manner.

DETAILED DESCRIPTION OF THE PREFERRED EMBODIMENTS

Figure 1:
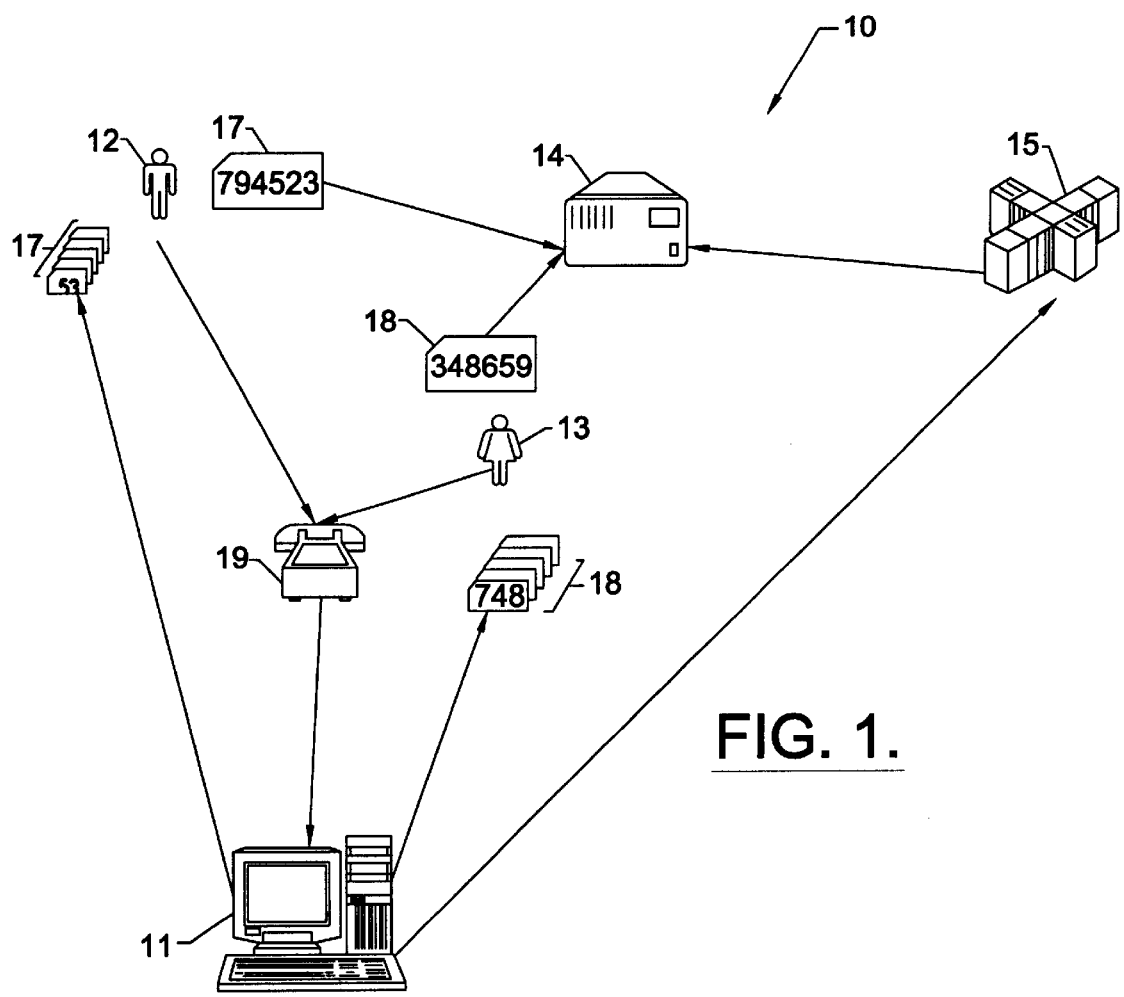
FIG. 1 is a schematic diagram of a system according to the present invention for establishing secure cryptographic keys.

Referring now to the accompanying drawings, FIG. 1 is a schematic diagram of a system, indicated generally at 10, according to the present invention. The system 10 comprises an intermediary device 11, a field device 14 and a host device 15. The intermediary device 11, the field device 14 and the host device 15 are each a cryptographic device for conducting secure electronic communications. Preferably, the intermediary device 11 is a conventional computer used in conjunction with a Tamper Resistant Security Module (TRSM), such as that sold by Eracom under the trade name CSA-7000. Preferably, the field device 14 is a conventional Automated Teller Machine (ATM). Preferably, the host device 15 is a conventional computer that acts as a server for a network of field devices, and in particular, ATMs.

Intermediary device 11 comprises means for generating a pool of random numbers. Concurrently with the generation of the pool of random numbers, a pool of reference numbers is also generated having a one-to-one correlation with the random numbers. Thus, each of the random numbers has a unique reference number. Each of the numbers in the pool of random numbers is then encrypted in a known manner and stored within intermediary device 11 indexed by its unique reference number. The operator of the intermediary device 11 creates a plurality of envelopes 17, 18. Each of the envelopes 17, 18 has one of the random numbers from the pool indicated, for example printed, on the inside of the envelope and the reference number corresponding to the random number inside the envelope indicated, for example printed, on the exterior or on the interior of the envelope. Preferably, envelopes 17 and 18 are tamper evident envelopes such as those that banks or other financial institutions use to transmit Personal Identification Numbers (PINs).

In a preferred embodiment, the operator of the intermediary device 11 provides several of the plurality of envelopes 17, 18 to each of two individuals 12, 13 for establishing a cryptographic key between the intermediary device 11 and the field device 14, as will be described in greater detail hereinafter. Individual 12, who is preferably an installation and service representative for field device 14, selects one of the several envelopes 17 provided to him or her and inspects the envelope for external evidence of tampering. In the event tampering is evident, that particular envelope 17 is discarded and the random number is thus eliminated from the pool of random numbers. After ensuring that an envelope 17 shows no external evidence of tampering, individual 12 opens the envelope and enters the random number indicated on the inside of the envelope 17 into the field device 14. The random number is entered into the field device 14 in a conventional manner including verification of the key check value.

Individual 13, who is preferably a bank representative, selects one of the several envelopes 18 provided to him or her and examines the envelope for external signs of tampering. In the event tampering is evident, that particular envelope 18 is discarded and the random number is thus eliminated from the pool of random numbers. After ensuring that an envelope 18 shows no external evidence of tampering, individual 13 opens the envelope and enters the random number indicated on the inside of the envelope 18 into the field device 14. The random number is entered into the field device 14 in a conventional manner including verification of the key check value.

Together the random numbers entered into the field device 14 from envelopes 17 and 18 form the cryptographic key for the field device. The use of two individuals to establish the cryptographic key is required to achieve the desired dual control and split knowledge necessary to ensure that the entire key remains secret. Accordingly, it is imperative that neither of the individuals 12, 13 discloses the random number inside their respective envelopes 17, 18 to the other.

Of course, this can most easily be accomplished by the operator of intermediary device 11 not divulging the identity of one individual to the other. It should be understood that entry of the random numbers inside the envelopes 17, 18 can be performed by one individual. However, such is not preferred since doing so violates the dual control and split knowledge requirement of the currently applicable standards for key management, such as ANS X9.24 Retail Key Management.

Upon successful entry of his or her random number into field device 14, individual 12 communicates the reference number of the envelope 17 corresponding to the random number on the inside of the envelope to the intermediary device 11. Preferably, the individual 12 communicates the reference number to the intermediary device 11 over a conventional telephone line 19 using a DTMF or "touch-tone" phone. It should be understood that any suitable known means can be employed to communicate the reference number to the intermediary device 11 including, but not limited to, the Internet and wireless communications devices, such as a cellular phone or terminal. Preferably, individual 12 is first required to communicate a predetermined USERID and ACCESS CODE to intermediary device 11 for security purposes. Upon verification of the authenticity of the USERID and ACCESS CODE, individual 12 is then prompted to transmit an ATM ID number or code and the reference number of the envelope 17 used to enter the corresponding random number into the field device 14. The encrypted random number indexed by the reference number is then retrieved from the memory of the intermediary device 11 for subsequent decryption as will be described hereinafter.

Individual 13 performs the same process substituting her or her USERID and ACCESS CODE to transmit the reference number corresponding to the random number inside envelope 18. As should be expected, intermediary device 11 verifies the USERID and ACCESS CODE provided by individual 13 before accepting the reference number of envelope 18. Preferably, intermediary device 11 compares the USERID provided by individual 13 to the USERID previously provided by individual 12 to ensure that the same individual does not enter both reference numbers for the same ATM ID. Still further, intermediary device 11 preferably compares the reference number provided by individual 13 to the reference number previously provided by individual 12 to ensure that two different random numbers are entered into the ATM. After successful transmission of the appropriate data to intermediary device 11, the envelopes 17 and 18 selected and used to establish the cryptographic key in the field device 14 are destroyed for security purposes.

Assuming that the individuals 12 and 13 and the data communicated to the intermediary device 11 are successfully verified, the encrypted random number indexed by the reference number transmitted by individual 13 is retrieved from the memory of the intermediary device 11, decrypted, and combined with the decrypted random number corresponding to the reference number provided by individual 12. The combined number forms the cryptographic key for the ATM identified by the ATM ID. Accordingly, the intermediary device 11 is in possession of the cryptographic key established in the field device 14. In the case of a network of ATMs, the cryptographic key is known as the ATM key for the particular ATM ID. The ATM key is next encrypted by a Key Encrypting Key (KEK) previously established between the intermediary device 11 and the Host Security Module (HSM) of the host device 15 using, for example, traditional methods of key management. Finally, the encrypted ATM key is transmitted by conventional means, such as a private network connection or a public telephone line, to the host device 15.

The HSM of the host device 15 shares the KEK with the intermediary device 11 and therefore is able to recover the clear-text ATM key. After decryption of the value encrypted by the KEK, the ATM key is encrypted once again using the Master Key of host device 15. Preferably, host device 15 is in electrical communication with field device 14 in a conventional manner. In a known manner, the normal host processing program, for example Applied Communications, Inc. (ACI) BASE24®, then uses its normal processing functions to transmit a new key encrypted by the newly established ATM key to the field device 14 to replace the ATM key established by the individuals 12 and 13.

Figure 2:
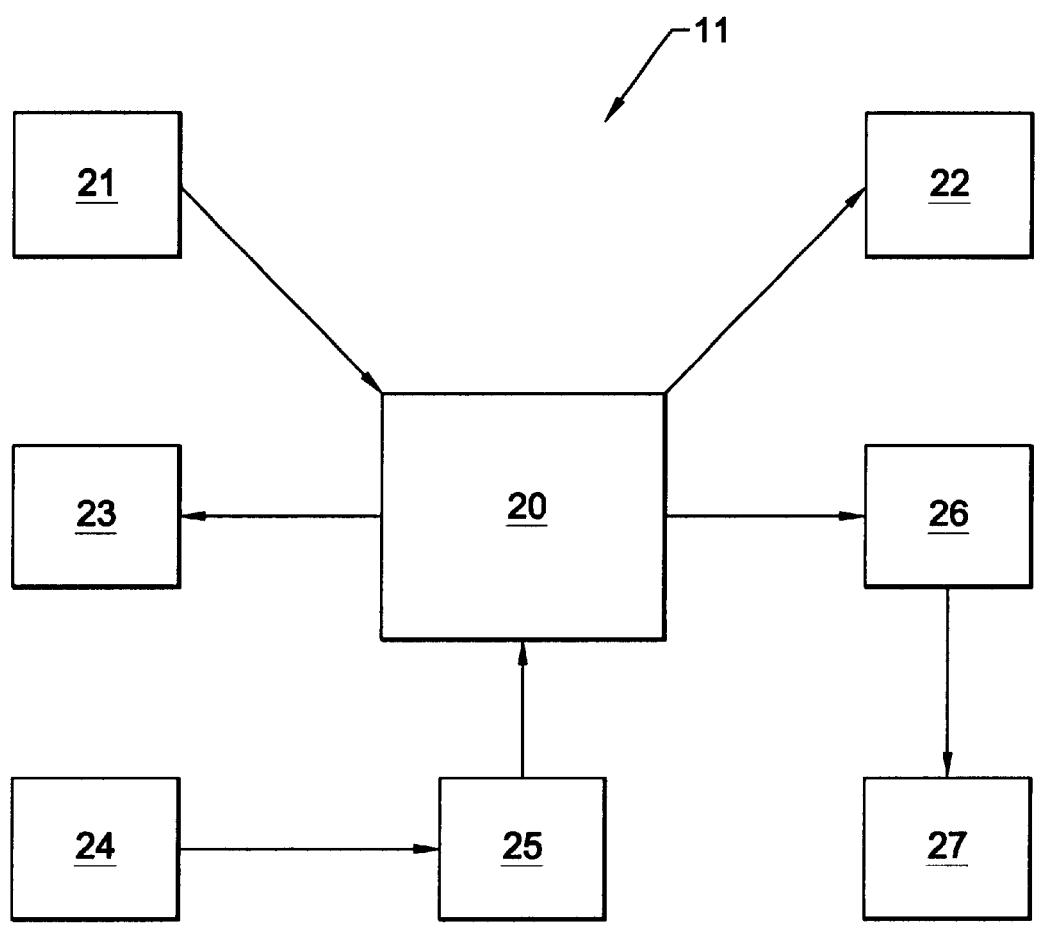
FIG. 2 is a schematic diagram of the intermediary device of the system of FIG. 1.

Intermediary device 11, as schematically illustrated in FIG. 2, comprises an Incoming Communication Services (ICS) unit 21. ICS unit 21 handles incoming phone calls or communications from the individuals 12 and 13 who physically enter the random numbers into field device 14. The preferred embodiment illustrated presupposes that the incoming communication is over a conventional telephone line by a DTMF or "touch-tone" phone. Thus, ICS unit 21 needs only to be a DTMF capable circuit, such as a commercially available Dialogic® or NewVoice circuit. However, any other functionally similar means of communication is acceptable. Outgoing Communication Services (OCS) unit 22 serves the purpose of communicating the encrypted ATM key from intermediary device 11 to host device 15. The communication can be implemented, for example via an Ethernet network, Token Ring network, or other suitable means. Applications Supervisor 20 serves to orchestrate the overall flow of the system processing. This includes USERID verification, ATM ID management and verification, and component management as well as acting as the communications interface.

System Log Service unit 23 provides a record of all operations that have taken place during the generation of the candidate components and the creation of the ATM key established in the field device 14. Electronic database 25 contains all the information required to run and maintain the system functions as well as the encrypted pool of random numbers. Preferably, the electronic database is the ACCESS 97 database program. However, any known functionally similar electronic database could be substituted for the ACCESS 97 database program. Crypto Services unit 26 provides all the required cryptographic processing support via a programming interface between application supervisor 20 and the cryptographic hardware TRSM 27, which as previously mentioned is preferably an Eracom CSA-7000 Cryptographic Adapter. However, any known functionally similar cryptographic adapter is acceptable. Administrative Services unit 24 handles the database maintenance and other general system administration functions.

Figure 3:
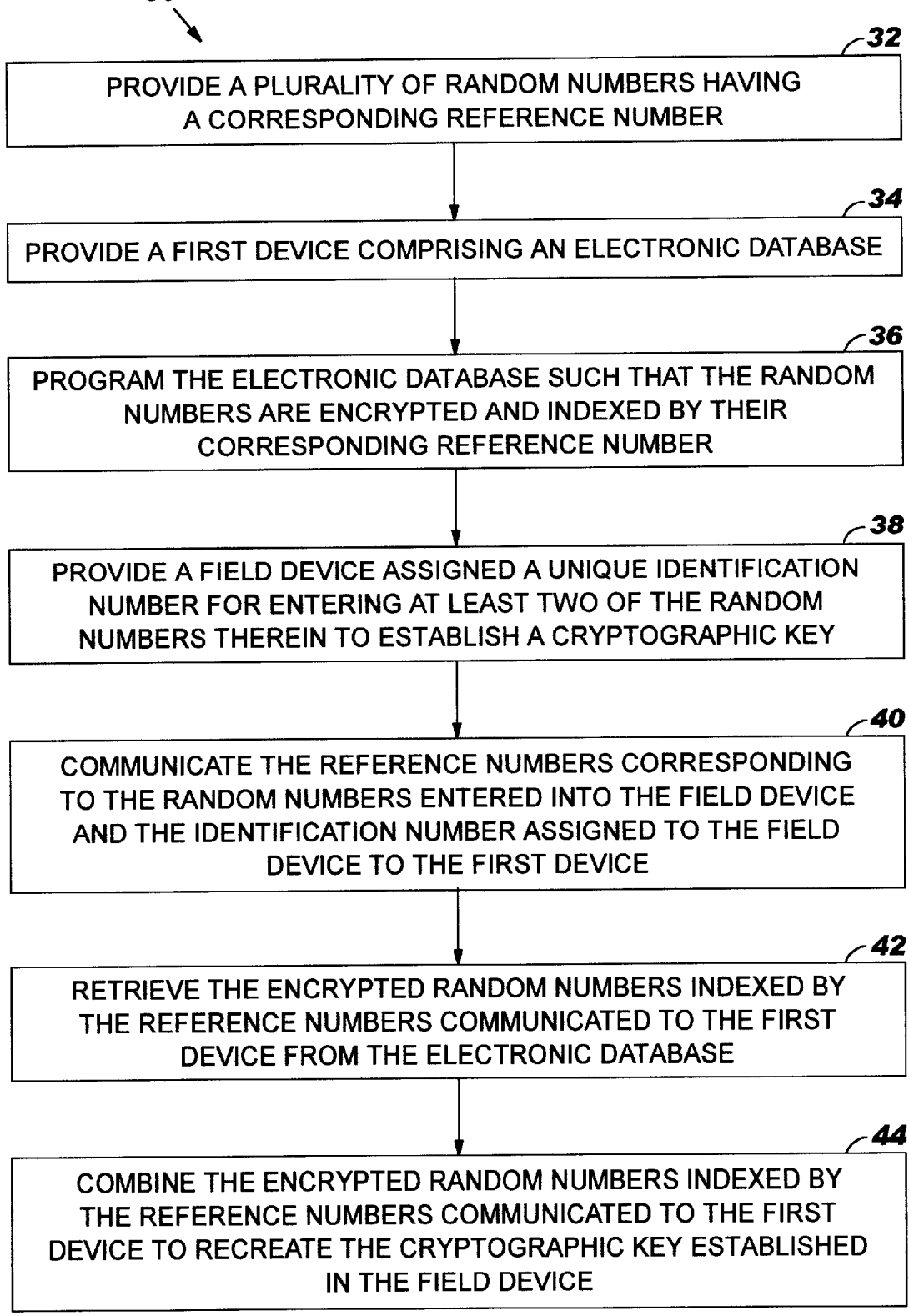
FIG. 3 is a flowchart of a method according to the present invention for establishing secure cryptographic keys.

FIG. 3 is a flowchart illustrating a preferred embodiment of a method 30 according to the invention. The method comprises the first step 32 of providing a plurality of random numbers, each having a corresponding reference number. Preferably, the plurality of random numbers is generated by a strong random number generator so that the likelihood of reoccurrence is extremely small. The method comprises the second step 34 of providing a host (i.e., first) device comprising an electronic database. Preferably, the first device is intermediary 11. However, the functions of the first device may also be accomplished by host device 15 operated, for example, by a bank or other financial institution. The method comprises the third step 36 of programming the electronic database such that the random numbers are encrypted and indexed by their corresponding unique reference numbers.

The method comprises the fourth step 38 of providing a field device 14 assigned a unique identification number for entering at least two of the random numbers therein to establish a cryptographic key. Preferably, the field device is an ATM and the unique identification number is an ATM ID. The method comprises the fifth step 40 of communicating the reference numbers corresponding to the random numbers entered into the field device 14 and the unique identification number assigned to the field device to the first device (ie., intermediary 11). Preferably, the reference numbers and the ATM ID are communicated to the first device by the individuals 12 and 13 via an interactive voice response unit such as a DTMF or "touch-tone" phone. The method comprises the sixth step 42 of retrieving, from the electronic database, the encrypted random numbers indexed by the reference numbers communicated to the first device. These retrieved encrypted random numbers are then decrypted. Finally, the method comprises the seventh step 44 of combining the decrypted random numbers indexed by the reference numbers communicated to the first device to recreate the cryptographic key established in the field device 14. The method may comprise the further step (not shown) of transmitting the cryptographic key recreated by the first device to yet another cryptographic device, such as host device 15.

The preceding recitation is provided as an example of a preferred embodiment according to the invention and is not meant to limit the nature or scope of the invention as defined by the appended claims. Specifically, while the system and method described herein are particularly well suited for establishing unique cryptographic keys between a plurality of ATMs and a host central computer, any pair of cryptographic devices that are geographically widely scattered and require secure electronic communications could implement the system and method of the invention.

What is claimed is:

1. A system for securely establishing a shared cryptographic key between a first cryptographic device and a second cryptographic device, said system comprising:

a plurality of randomly-generated key components, each of said plurality of key components having a corresponding unique component identifier that is used as an index to store an encrypted version of the key component in an electronic database accessible to a first cryptographic device;

means for separately entering into a second cryptographic device, by each of a plurality of key custodians, a different one of said plurality of key components, said second cryptographic device being assigned a unique device identifier;

means for combining, at the second cryptographic device, the plurality of entered key components to create a new shared cryptographic key to be shared between the second cryptographic device and the first cryptographic device;

means for communicating, to the fist cryptographic device, the unique component identifier corresponding to each one of the entered key components and said unique device identifier assigned to said second cryptographic device; and means for determining, by the first cryptographic device, the shared cryptographic key, further comprising:

means for receiving each of the communicated unique component identifiers and the communicated unique device identifier;

means for using each of the received unique component identifiers as the index into the electronic database, to retrieve the stored encrypted version of each of the key components to which the received unique component identifiers correspond;

means for decrypting each of said retrieved encrypted versions of the key components, thereby creating decrypted key components;

means for combining said decrypted key components to create the first cryptographic device's copy of said shared cryptographic key created in said second cryptographic device; and means for determining that the copy is the shared cryptographic key to be shared between the first cryptographic device and the second cryptographic device, because the unique device identifier received with the unique component identifiers is assigned to the second cryptographic device.

2. The system according to claim 1, wherein said first cryptographic device is a host security module.

3. The system according to claim 1, wherein said send cryptographic device is a bank Automated Teller Machine (ATM).

4. The system according to claim 1, wherein said means for communicating comprises an interactive voice response unit.

5. The system according to claim 1, further comprising a plurality of tamper evident envelopes for retaining and transporting said plurality of key components from said first cryptographic device to said second cryptographic device.

6. A method for securely establishing a shared cryptographic key between a first cryptographic device and a second cryptographic device, said method comprising steps of:

providing a plurality of randomly-generated key components, wherein each of the plurality of key components has a corresponding unique component identifier;

programming an electronic database of a first cryptographic device such that an encrypted version of each of the plurality of key components is stored therein, each of the encrypted versions indexed by its corresponding unique component identifier;

separately entering, into a second cryptographic device by each of a plurality of key custodians, a different one of the plurality of key components, the second cryptographic device being assigned a unique device identifier;

combining, by the second cryptographic device, the entered key components to create a new shared cryptographic key to be shared between the second cryptographic device and the first cryptographic device;

communicating, to the first cryptographic device, the unique component identifier corresponding to each of the entered key components and the unique device identifier assigned to the second cryptographic device;

receiving, by the first cryptographic device, the communicated unique component identifiers and the communicated unique device identifier;

using, by the first cryptographic device, each of the received unique component identifiers as the index into the electronic database, to retrieve the stored encrypted version of the key components to which the received unique component identifiers correspond;

decrypting, by the first cryptographic device, the retrieved encrypted version of each of the key components, thereby creating decrypted key components;

combining, by the first cryptographic device, the decrypted key components to create a copy of the shared cryptographic key created in the second cryptographic device; and determining, by the first cryptographic device, that the copy is the shared cryptographic key to be shared between the first cryptographic device and the second cryptographic device, because the unique device identifier received with the unique component identifiers is assigned to the second cryptographic device.

7. The method according to claim 6, further comprising the steps of:

securely transmitting the copy of the shared cryptographic key created in he first cryptographic device to a third cryptographic device.

8. The method according to claim 6, wherein the step of providing a first cryptographic device comprises the further step of providing a host security module.

9. The method according to claim 6, wherein the step of providing a second cryptographic device comprises the further step of providing a bank Automated Teller Machine (ATM).

10. The method according to claim 6, wherein the step of communicating comprises the further step of electronically communicating the unique component identifiers corresponding to the entered key components and the unique device identifier to the first cryptographic device via an interactive voice response unit.

11. The method according to claim 6, wherein the step of providing a plurality of key components comprises the further steps of sealing each of the key components in a separate tamper evident envelope and marking each envelope with the unique component identifier corresponding to the key component sealed therein.

12. A method for securely establishing a shared cryptographic key between a first cryptographic device and a second cryptographic device, comprising steps of:

initially creating, at the second cryptographic device, a copy of the shared cryptographic key, further comprising steps of:

entering, by each of at least two key custodians, a distinct key component into the second cryptographic device; and combining the entered key components, thereby creating the second cryptographic device's copy of the shared cryptographic key;

communicating, to the first cryptographic device for each of the entered key components, a unique component identifier that corresponds to the entered key component, along with a unique device identifier assigned to the second cryptographic device; and subsequently creating, by the first cryptographic device, another copy of the shared cryptographic key, further comprising steps of:

receiving the communicated unique component identifiers and the communicated unique device identifier;

using each of the received component identifiers as an index value to retrieve, from a database in which encrypted versions of a plurality of key components, including the entered key components, are stored with their corresponding unique component identifier as the index value, the encrypted version corresponding to each of the received component identifiers; and combining decrypted versions of each of the retrieved encrypted versions, thereby creating the first cryptographic device's copy of the shared cryptographic key, wherein the first cryptographic device uses the communicated unique device identifier to identify the second cryptographic device with which this shared cryptographic key is to be shared.

13. The method according to claim 12, wherein the communicating step is not communicating from the second cryptographic device.

* * * * *

UNITED STATES PATENT AND TRADEMARK OFFICE
CERTIFICATE OF CORRECTION

PATENT NO. : 6,606,387 B1 Page 1 of 1
DATED : August 12, 2003
INVENTOR(S) : Abraham, Dennis G.

It is certified that error appears in the above-identified patent and that said Letters Patent is hereby corrected as shown below:

Column 9,
Line 21, change "send" to read -- second --.

Column 10,
Line 14, change "he" to read -- the --.

Signed and Sealed this

Twenty-second Day of March, 2005

JON W. DUDAS
*Director of the United States Patent and Trademark Office*